United States Patent [19]

Roose

[11] 4,248,560
[45] Feb. 3, 1981

[54] BALE CARRIER AND METHOD FOR USING SAME

[76] Inventor: Gerald L. Roose, R.F.D. 3, Pella, Iowa 50219

[21] Appl. No.: 911,335

[22] Filed: Jun. 1, 1978

[51] Int. Cl.$^3$ ............................................... B60P 3/00
[52] U.S. Cl. .............................. 414/24.5; 280/43.23; 280/46; 414/459; 414/786
[58] Field of Search ............... 280/43.23, 43.11, 46; 414/469, 476, 477, 482, 485, 495, 498, 434, 436, 458, 459, 703, 786, 24.5, 24.6

[56] References Cited

U.S. PATENT DOCUMENTS

| | | | |
|---|---|---|---|
| 1,244,783 | 10/1917 | Ruckes | 414/459 |
| 2,711,329 | 6/1955 | Fritz | 414/480 X |
| 3,039,633 | 6/1962 | Mindrum et al. | 414/458 |
| 3,271,042 | 9/1966 | Flodin | 280/43.23 |
| 3,935,954 | 2/1976 | Woods et al. | 414/485 X |
| 4,008,902 | 2/1977 | Dill | 280/43.23 X |
| 4,023,693 | 5/1977 | Priefert | 414/24.5 |
| 4,076,137 | 2/1978 | Kucera | |

Primary Examiner—Frank E. Werner
Attorney, Agent, or Firm—Zarley, McKee, Thomte, Voorhees & Sease

[57] ABSTRACT

A bale carrier comprising a horizontally disposed U-shaped frame having an open rearward end and a forward end. The U-shaped frame includes first and second side frame members having a front frame member secured thereto and extending between the forward ends thereof. A rocker shaft is rotatably supported by the front frame member and has a hitch secured thereto which extends forwardly therefrom for connection to a prime mover. Rearwardly extending elongated members are secured to opposite ends of the rocker shaft so that longitudinal movement of the elongated members causes the rocker shaft to be rotated. Wheel supports are pivotally secured to the side frame members adjacent the rearward ends thereof and are pivotally connected to the rearward ends of the elongated members. A ground-engaging wheel is mounted on each of the wheel supports whereby pivotal movement of the wheel supports, relative to the side frame members, causes the U-shaped frame to be raised and lowered with respect to the ground. A power cylinder is connected to each of the wheel supports for pivotally moving the wheel supports relative to the side frame members. The device may be used for transporting hay bales or other objects such as livestock pens or the like.

4 Claims, 8 Drawing Figures

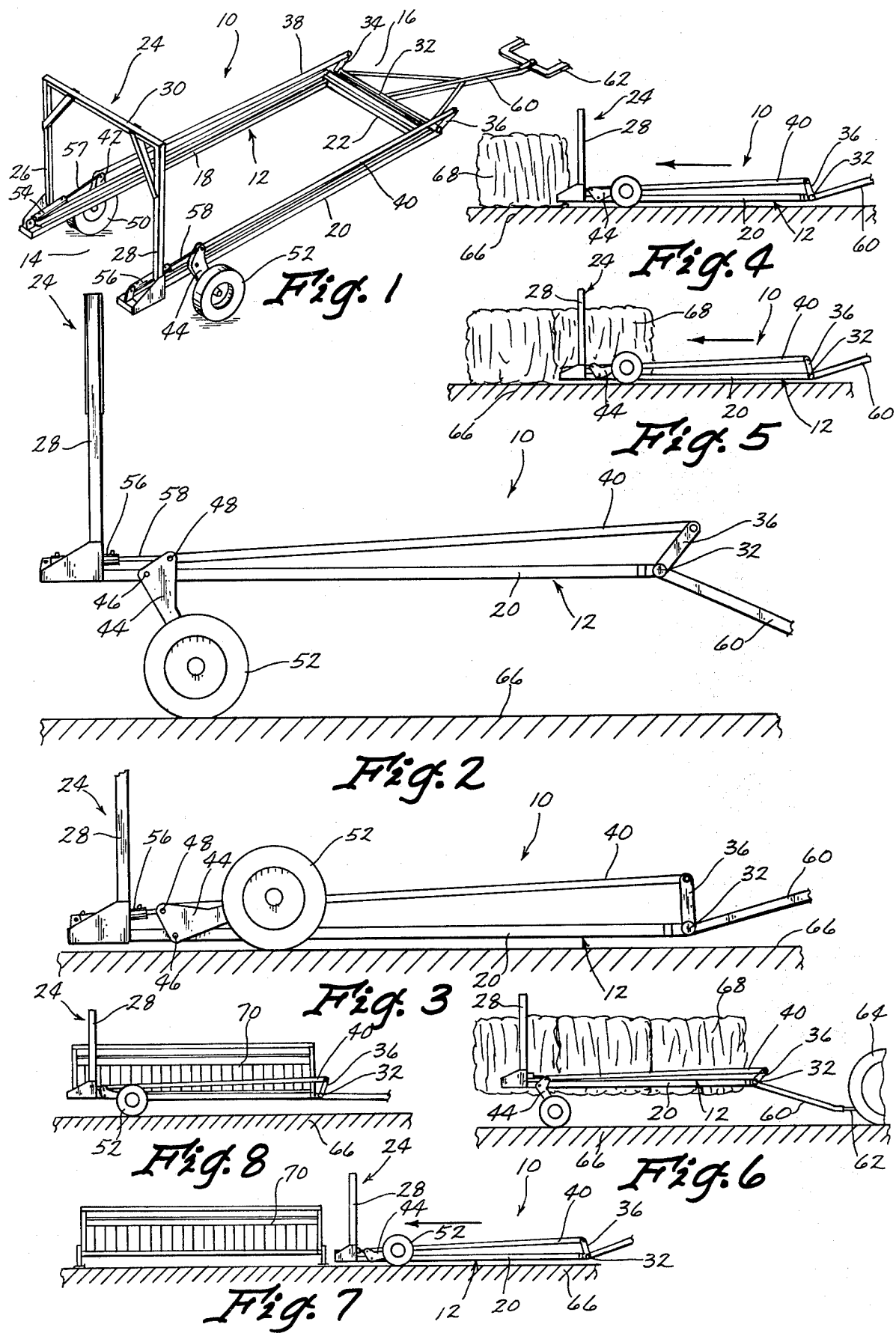

4,248,560

BALE CARRIER AND METHOD FOR USING SAME

BACKGROUND OF THE INVENTION

This invention relates to a transporting device and more particularly to a hay bale transporting device which may be used to transport the extremely large bales that are now being used in cattle-feeding operations. Many baling devices have been recently designed which enable hay to be rolled into bales in excess of 1,000 pounds. The large bales are difficult to handle and are difficult to transport from one location to another.

Many types of bale transporting devices have been provided but the same are somewhat inconvenient to use and normally include a great number of moving parts. Additionally, the conventional bale carriers are not designed to be used for transporting anything other than hay bales.

Therefore, it is a principal object of the invention to provide an improved bale transporting device.

A still further object of the invention is to provide a bale transporting device which may also be used for transporting livestock.

A further object of the invention is to provide a hay bale carrier which has an open rearward end to enable the carrier to be moved rearwardly around the bale.

A still further object of the invention is to provide a bale carrier having a novel equalizing means for raising and lowering the U-shaped frames means in a level manner.

A still further object of the invention is to provide a transporting device which is economical of manufacture, durable in use and refined in appearance.

BRIEF DESCRIPTION OF THE DRAWINGS

FIG. 1 is a rear perspective view of the device of this invention:

FIG. 2 is a side view of the device with the frame means in a raised position:

FIG. 3 is a view similar to FIG. 2 except that the frame means has been lowered towards the ground:

FIGS. 4–6 are side views illustrating the sequence of loading a bale onto the carrier; and FIGS. 7 and 8 are side views illustrating the sequence of loading a livestock pen onto the carrier.

SUMMARY OF THE INVENTION

A transporting device is disclosed which may be used to transport hay bales or livestock pens. The device comprises a horizontally disposed U-shaped frame means having an open rearward end and a forward end. The U-shaped frame means comprises first and second side frame members having a front frame member secured to the forward ends thereof and extending therebetween. A rocker shaft is rotatably mounted on the front frame member and has a hitch secured thereto which extends forwardly therefrom for connection to a prime mover. First and second elongated members are secured to opposite ends of the rocker shaft whereby longitudinal movement of the first and second elongated members causes the rocker shaft to be rotated. First and second wheel supports are pivotally secured to the side frame members adjacent the rearward ends thereof and are connected to the rearward ends of the first and second elongated members respectively. A ground-engaging wheel is rotatably mounted on each of the wheel supports whereby pivotal movement of the wheel supports relative to the side frame member, in first and second directions, causes the frame means to be raised and lowered with respect to the ground. A hydraulic cylinder is operatively connected to the frame means and each of the wheel supports for pivotally moving the wheel supports to raise and lower the frame means.

DESCRIPTION OF THE PREFERRED EMBODIMENT

The transporting device of this invention is referred to generally by the reference numeral 10 and is comprised of a U-shaped frame means 12 having an open rearward end 14 and a forward end 16. Frame means 12 includes spaced apart double tubing side frame members 18 and 20 having a front frame member 22 secured to the forward ends thereof and extending therebetween.

An upstanding arch-like support 24 is provided at the rearward end of the device and includes vertical support members 26 and 28 which are secured to side frame members 18 and 20 and which extend upwardly therefrom. Top support 30 is secured to and extends between the upper ends of the supports 26 and 28 as illustrated in the drawings. Support 24 serves to stabilize the frame means to prevent the rearward ends of the side frame members 18 and 20 from moving towards or away from one another.

Rocker shaft 32 is rotatably secured to the forward end of front frame member 22 and extends transversely with respect to the direction of movement of the device. Arms 34 and 36 are welded or otherwise secured to opposite ends of the shaft 32 and extend upwardly therefrom as also seen in the drawings. Elongated pipes or members 38 and 40 are pivotally secured to the upper ends of arms 34 and 36 respectively and extend rearwardly therefrom.

Wheel supports 42 and 44 are pivotally secured to side frame members 18 and 20. As seen in FIG. 2, wheel support 44 is pivotally secured to side frame member 20 at 46. Wheel support 42 is similarly pivotally secured to side frame member 18. The rearward end of elongated member 40 is pivotally secured to wheel support 46 at 48. The rearward end of elongated member 38 is also pivotally connected to wheel support 42 in a fashion identical to that just described.

Wheels 50 and 52 are rotatably mounted on the lower ends of the wheel supports 42 and 44. Hydraulic cylinder 54 is pivotally connected at its base end to the rearward end of side frame member 18 and has its cylinder rod 57 pivotally connected to the upper end of the wheel support 42. Hydraulic cylinder 56 is pivotally connected at its base end to the rearward end of side frame member 20 and has its cylinder rod 58 pivotally connected to wheel support 44 at 48.

A conventional hydraulic equalizer (not shown) should preferably be inserted into the hydraulic circuit for cylinders 54, 56 so as to cause the pressures therein to be equal. This equalization is important due to the independent action of the two cylinders 54, 56 so as to insure that they move in unison.

The numeral 60 refers to a hitch which is welded to rocker shaft 32 and which extends forwardly therefrom for connection to the drawbar 62 of a prime mover generally referred to by the reference numeral 64 in FIG. 6.

It can be seen in FIG. 2 that when the cylinder rods of the power cylinders 54 and 56 are extended, wheel supports 42 and 44 are pivoted in a clockwise manner with respect to the side frame members 18 and 20 so that the frame means is raised relative to the ground 66. The pivotal connection of the wheel supports 42 and 44 with the rocker shaft 32, by means of the elongated members 38, 40 and arms 24, 36 causes the rotational movement of the rocker shaft so that the side frame members 18 and 20 are raised relative to the ground in a level condition. If the pivotal connection between the wheel supports and the rocker shaft was not provided, the forward end of the frame means would tend to be lower than the rearward end of the frame means when the frame means was in the raised condition.

Retraction of the cylinder rods of the cylinders 54 and 56 causes the frame means to be lowered from the position of FIG. 2 to the position of FIG. 3. As seen in FIG. 3, the forward end of the frame means has also been lowered due to the connection of the wheel supports with the rocker shaft.

The device is used as follows. Assuming that the cylindrical bale 68 is resting on the ground 66 as depicted in FIG. 4, the hydraulic cylinders 54 and 56 are retracted, by means of the tractor hydraulic system, so that the frame means 12 is lowered towards the ground. The carrier 10 is then moved rearwardly with respect to the bale 68 by the prime mover so that the side frame members 18 and 20 are moved rearwardly with respect to the bale 68. It should be noted that the bale 68 is of the cylindrical type so that the side frame members 18 and 20 will be moved rearwardly beneath the "sides" of the bale 68. In other words, the distance between side frame members 18 and 20 will be less than the diameter of the bale 68.

The device 10 is continued to be moved with respect to the bale 68 until the bale is positioned between the side frame members as depicted in the drawings. The hydraulic cylinders 54 and 56 are then extended so that the frame means is raised relative to the ground with the side frame members 18 and 20 engaging the undersides of the bale to raise the bale from the ground supported position of FIGS. 4 and 5 to the position of FIG. 6. The bale may then be transported to the desired location and unloaded by a procedure opposite to that just described.

It should be noted also that the device may be used for transporting livestock pens 70 in a similar fashion to bales. Ordinarily, a flatbed or the like would be positioned on and between the side frame members 18 and 20 so that the flatbed would engage the underside of the livestock pen 70 as the pen was being raised from the ground. FIGS. 7 and 8 illustrate the pen being supported on the ground and on the carrier respectively.

Thus it can be seen that a novel transporting device has been provided which accomplishes at least all of its stated objectives.

I claim:

1. A transporting device for transporting a pen and alternatively a plurality of cylindrical bales, said transporting device comprising:

a horizontally disposed U-shaped frame comprising a front frame member and first and second side frame members extending rearwardly from the opposite ends of said front frame member to terminate in rearward ends spaced apart from one another, the lengths of said side frame members being at least greater than the cylindrical length of at least two of said bales and the distance between said side frame members being less than the diameters of said bales;

first and second wheel supports, each pivotally mounted to one of said side frame members adjacent said rearward ends thereof for pivotal movement about a first axis between an upstanding position supporting said U-shaped frame in an upper position and a collapsed position, supporting said U-shaped frame in a lower position adjacent the ground, first and second rods each having a forward end and a rearward end, said forward end being pivoted to one of said wheel supports about a second axis spaced from said first axis;

a rocker shaft rotatably supported by said front frame member for rotation about a third horizontal axis parallel to said first and second axes;

hitch means fixed to said rocker shaft and extending forwardly therefrom for connection to a prime mover, first and second arm members having first ends hinged to said forward end of said first and second rods respectively, said arm members having second ends fixed to said rocker shaft for rotation in unison therewith about said third axis;

power cylinder means operatively connected to said U-shaped frame and said wheel supports for pivotally moving said wheel supports to raise and lower said frame relative to the ground;

an upstanding inverted U-shaped support having the lower inverted U-shaped ends thereof connected to said side frame members adjacent the rearward ends thereof to bridge the distance therebetween, the height of said inverted U-shaped support being greater than the diameter of said bales, said inverted U-shaped member being the only cross member spanning the distance between said side frame members along the lengths thereof rearwardly of said forward member whereby at least two bales will fit end to end between said side members;

a livestock pen resting on said frame members and being selectively removable therefrom whenever said frame members are used to carry said bales.

2. The structure of claim 1 wherein said power cylinder means comprises a first hydraulic cylinder connected to one of said side frame members and a second hydraulic cylinder connected to the other of said side frame members, said first and second cylinders being connected in a hydraulic circuit with a hydraulic equalizer for causing the pressures in said cylinder to be equal so that said cylinders move in unison.

3. The structure of claim 3 wherein said side frame members of said U-shaped frame are sufficiently long to embrace at least three of said bales arranged in axial end to end relation within the U-shaped opening defined by said U-shaped frame.

4. A method for using a transporting device for transporting an animal pen and alternatively a plurality of cylindrical bales, said transporting device comprising a horizontally disposed U-shaped frame comprising a front frame member and first and second side frame members extending rearwardly from the oppsite ends of said front frame member to terminate in rearward ends spaced apart from one another, the lengths of said side frame members being at least greater than the cylindrical length of at least two of said bales and the distance between said side frame members being less than the diameters of said bales; first and second wheel supports, each pivotally mounted to one of said side frame members adjacent said rearward ends thereof for pivotal movement about a first axis between an upstanding position supporting said U-shaped frame in an upper position and a collapsed position, supporting said U-shaped frame in a lower position adjacent the ground, first and second rods each having a forward end and a rearward end, said forward end being pivoted to one of said wheel supports about a second axis spaced from said first axis; a rocker shaft rotatably supported by said front frame member for rotation about a third horizontal axis parallel to said first and second axes; hitch means fixed to said rocker shaft and extending forwardly therefrom for connection to a prime mover, first and second arm members having first ends hinged to said forward end of said first and second rods respectively, said arm members having second ends fixed to said rocker shaft for rotation in unison therewith about said third axis; power cylinder means operatively connected to said U-shaped frame and said wheel supports for pivotally moving said wheel supports to raise and lower said frame relative to the ground; an upstanding inverted U-shaped support having the lower inverted U-shaped ends thereof connected to said side frame members adjacent the rearward ends thereof to bridge the distance therebetween, the height of said inverted U-shaped support being greater than the diameter of said bales, said inverted U-shaped member being the only cross member spanning the distance between said side frame members along the lengths thereof rearwardly of said forward member whereby at least two bales will fit end to end between said side members; a livestock pen resting on said side frame members and being selectively removable therefrom whenever said frame members are used to carry said bales; said method comprising:

removing said pen frame from said frame members;

positioning said horizontally disposed U-shaped frame and said upstanding U-shaped frame adjacent one of said bales with the U-shaped openings of said upstanding and horizontally disposed U-shaped frames facing one of said cylindrical ends of said bale;

lowering said horizontally disposed U-shaped frame to a lower position adjacent the surface supporting said one bale;

moving said horizontal U-shaped frame rearwardly toward said bale so that said side frame members of said frame pass on opposite sides of said one bale below the extreme outer diameter of said bale, said upstanding U-shaped frame passing over said bale during said rearward movement of said horizontal frame;

lifting said horizontal frame until said side frame members thereof engage said one bale and lift said one bale from said supporting surface;

moving said device to a new location adjacent a second bale;

lowering said horizontal frame member to said lower position;

moving said horizontal U-shaped frame rearwardly toward said second bale so that said side frame members pass on opposite sides thereof, thereby causing said one bale and said second bale to be positioned in end-to-end relationship within said U-shaped opening of said horizontal frame;

lifting said horizontal frame to lift said one bale and said second bale off said supporting surface;

moving said U-shaped frame member and said bales to a new location;

lowering said rails to their lower position;

moving said horizontal U-shaped frame longitudinally forwardly so as to remove said side frame members from opposite sides of said one bale and said second bale, said upstanding U-shaped member passing over said one bale and said second bale during said forward longitudinal movement.

* * * * *